PLURAL EMITTER TYPE ACTIVE ELEMENT MEMORY

Filed June 28, 1966

INVENTOR:
ROBERT C. MARTIN

E. Mickey Hubbard
ATTORNEY 3,436,738

PLURAL EMITTER TYPE ACTIVE ELEMENT MEMORY

Robert C. Martin, Dallas, Tex., assignor to Texas Instruments Incorporated, Dallas, Tex., a corporation of Delaware Filed June 28, 1966, Ser. No. 561,196
Int. Cl. G11b *9/00*
U.S. Cl. 340—173 10 Claims This invention relates generally to memory systems, and more particularly relates to a memory system utilizing a binary storage bit formed by active semiconductor components.

Considerable effort has been devoted to the development of active element memory systems. In general, the circuits used as storage elements or bits have required the use of a relatively large number of active elements in order to function reliably. As a result, memory systems utilizing active semiconductor circuits to form the storage bits have not been widely used. Substantially all commercially successful memory systems have used magnetic cores, magnetic tapes, magnetic drums, or magnetic thin films as the storage means for information storage, processing and retrieval.

An object of this invention is to provide an improved binary storage means which has a minimum number of active components, yet which is reliable and fast.

Another object of the invention is to provide a semiconductor memory means the input and output logic levels of which are compatible with semiconductor logic gates so that an additional interface is not required.

Another important object of the invention is to provide such a memory system having random access and non-destructive readout.

Another object is to provide such a system wherein at least one level of address decoding is accomplished by the same active elements used for storage.

Another object is to provide such a system having common write-read drive lines.

A furhter object is to provide such a system wherein a number of storage bits may be fabricated in integrated circuit form on a single substrate together with address decoding circuits and the necessary write-read circuits, thus providing a complete memory on a single semiconductor substrate.

Still another object is to provide a modular building block which may be used to form substantially any size memory system.

These and other objects are accomplished by utilizing a binary storage bit comprising a pair of multiple emitter transistor means the collectors of which are connectable to voltage supply means and the bases and collectors of which are cross-coupled to provide regenerative switching. The storage bit may then be selectively addressed by reverse biasing all emitters except one on each transistor means. The binary number may then be stored by applying different voltage levels to the remaining emitter of the two transistor means so as to cause current from the voltage supply means to be switched through one or the other of the transistor means as a result of regenerative switching. The stored binary number may then be sensed by detecting the presence or absence of current through either of the transistor means when the storage means is again addressed. The storage bits may be arranged into multi-bit words, which may be individually addressed with parallel-by-bit write-read capability.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 5:
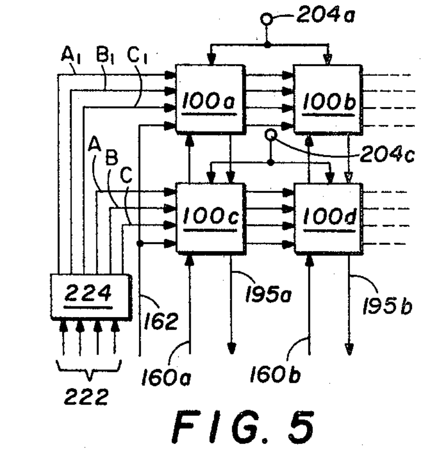
Figure 4:
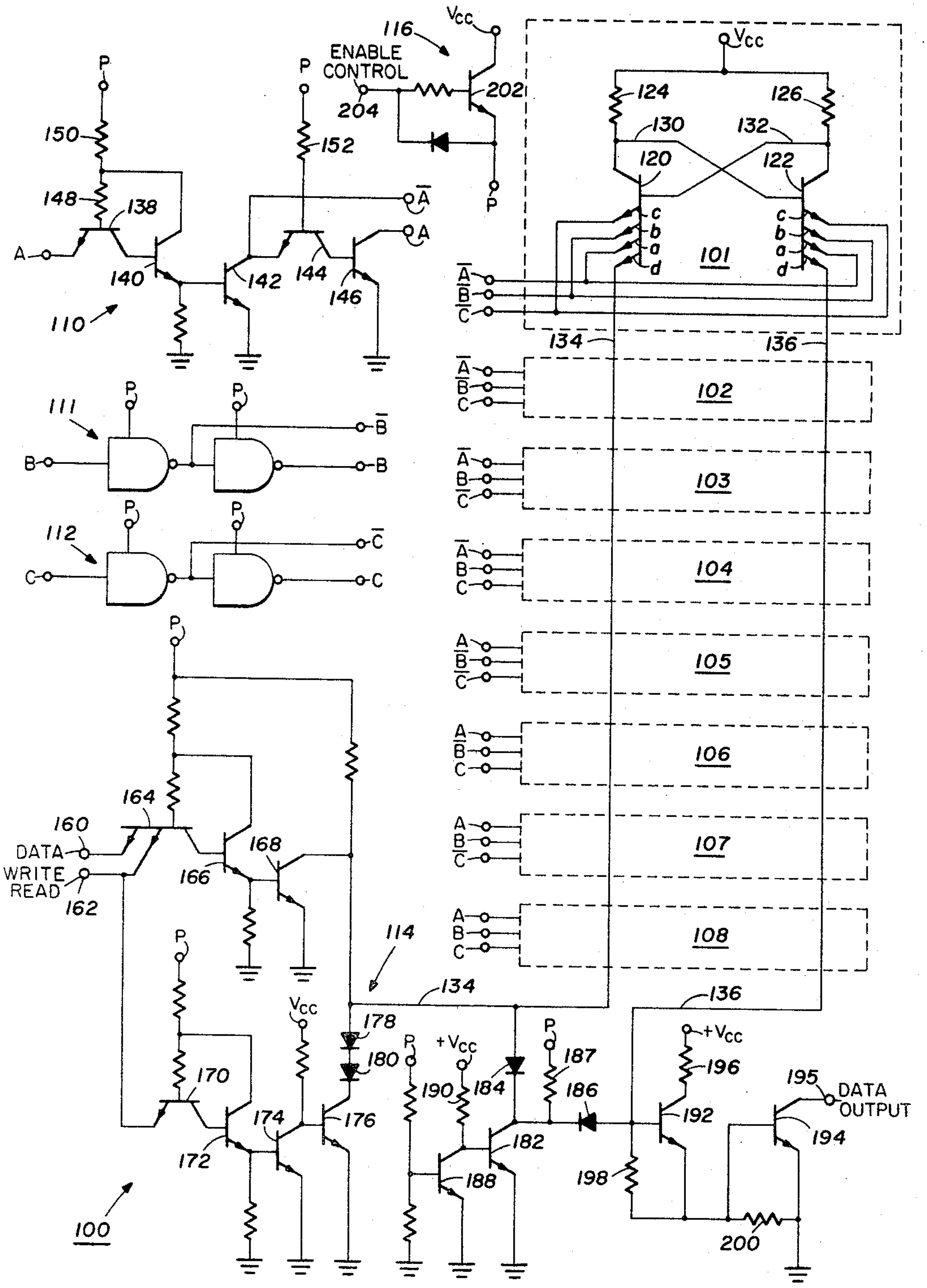

FIGURE 4 is a schematic circuit diagram of an eight word memory array, each word having one bit, including address decoding and the write-read circuit means, all of which is typically placed on a single integrated circuit chip to form a modular building block for producing memory systems of substantially any size; and FIGURE 5 is a schematic diagram illustrating how a plurality of circuit of FIGURE 4 can be connected to form a memory having a greater number of words each having a greater number of bits.

Figure 1:
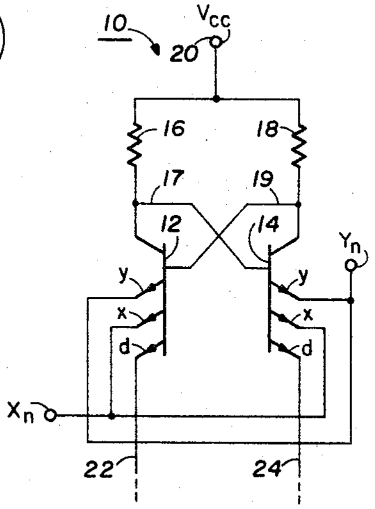
FIGURE 1 is a schematic circuit diagram of a binary storage bit constructed in accordance with the present invention.

Referring now to the drawings, and in particular to FIGURE 1, a binary storage bit constructed in accordance with the present invention is indicated generally by the reference numeral 10. The storage bit 10 is comprised of first and second multiple emitter transistor means 12 and 14. In the preferred embodiment each of the transistor means 12 and 14 comprises a transistor having a single collector region and a single base region, with a plurality of separate emitter regions formed within the base region. However, within the broader aspects of the invention, the transistor means 12 and 14 may each comprise a plurality of discrete transistors with the collectors and bases of the transistors common. Although NPN transistors are used exclusively in the specific embodiment herein described, PNP transistors may be used if desired. Since it is very difficult and cumbersome to generically describe a circuit so as to cover both NPN and PNP transistors, the following specification and claims describe NPN circuits, but are to be interpreted as covering the PNP equivalents. Resistors 16 and 18 connect the collectors of transistors 12 and 14, respectively, to a collector voltage supply terminal 20. Emitter Y of each of the transistors 12 and 14 is connected to an address line $Y_n$. Similarly, emitter X of each of the transistors 12 and 14 is connected to an address line $X_n$. The remaining emitter *d* of transistor 12 is connected to a logic "0" write-read line 22 and the remaining emitter *d* of transistor 14 is connected to a logic "1" write-read line 24. The collector of transistor 12 is cross-coupled to the base of transistor 14 by conductor 17, and the collector of transistor 14 is cross-coupled to the base of transistor 12 by conductor 19 to provide regenerative switching.

The bit 10 is addressed by applying a logic "1" level to address drive lines $X_n$ and $Y_n$, the logic "1" level customarily being essentially an open circuit, so that the current through the X and Y emitters of transistors 12 and 14 is cut off. As a result, current from the collector voltage supply must pass either through emitter *d* of transistor 12 or emitter *d* of transistor 14. Transistors 12 and 14 cannot conduct simultaneously because of the cross-coupling circuits 17 and 19 which provide regenerative switching or latching. Thus, if the current through emitter *d* of transistor 12 exceeds the current through emitter *d* of transistor 14, the potential at the collector of transistor 12 will fall, thus tending to turn transistor 14 "off". This in turn raises the potential at the collector of transistor 14 which tends to turn transistor 12 "on". The currents through emitters *d* of transistors 12 and 14 can be controlled by raising the potentials at the respective emitters. Thus, if emitter *d* of transistor 12 is made more positive than the potential of emitter *d* of transistor 14, the current through transistor 14 will tend to exceed the current through transistor 12 such that transistor 14 will be turned "on" and transistor 12 turned "off".

The logic number stored in the bit 10 may be detected by addressing the bit, i.e., bringing the $X_n$ and $Y_n$ address lines up to a logic "1" level, and then detecting the presence or absence of current in either write-read line 22 or write-read line 24. If either the $X_n$ or $Y_n$ drive line is at a logic "0" level, then changes in the relative potentials of write-read lines 22 and 24 will not affect the state of transistors 12 and 14 since the current passing through either will be free to pass either from the *x* or *y* emitter. On the other hand, if the bit is addressed by raising both the $X_n$ and $Y_n$ address lines to a logic "1" level, then the current must flow through the *d* emitter of either transistor 12 or 14 and the presence or absence of the current in lines 22 and 24 will indicate the state of transistors 12 and 14 and therefore the binary number stored in the bit. During the read mode, the *d* emitters of both transistors 12 and 14 are maintained at substantially the same voltage level which is selected greater than the logic "0" level on the address drive lines so that when the bit is not addressed, the current will be diverted through one of the address emitters rather than the write-read emitters.

Figure 2:
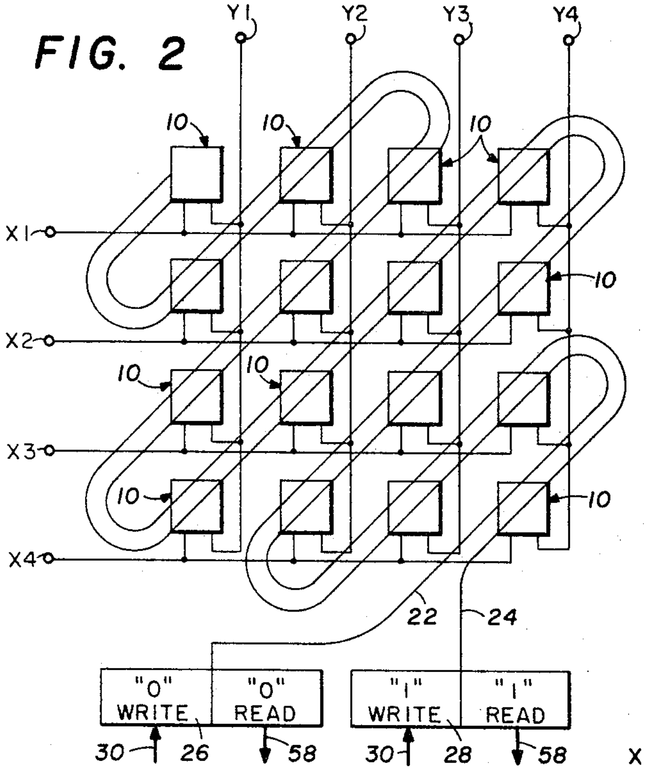
FIGURE 2 is a schematic block diagram of an array of storage bits such as illustrated in FIGURE 1, the array being arranged to form sixteen words each having one bit.

In FIGURE 2, sixteen storage bits 10 are arranged in a 4 x 4 array to provide four horizontal rows and four vertical columns. The *x* address emitters of the storage bits in the first row are connected to address line $X_1$, those in the second row are connected to the address line $X_2$, those in the third row are connected to the address line $X_3$, and those in the fourth row are connected to address line $X_4$. Similarly, the Y address emitters of the bits in the first column are connected to address line $Y_1$, those in the second column are connected to the address line $Y_2$, those in the third column are connected to address line $Y_3$, and those in the fourth column are connected to address line $Y_4$. Thus, by simultaneously bringing the coincident X and Y address lines up to a logic "1" level, any of the sixteen bits may be addressed or enabled as will presently be described. The write-read drive line 22 of all sixteen bits is connected to a logic "0" write-read amplifier 26, and the write-read drive line 24 of all sixteen bits is connected to a logic "1" write-read amplifier 28.

Figure 3:
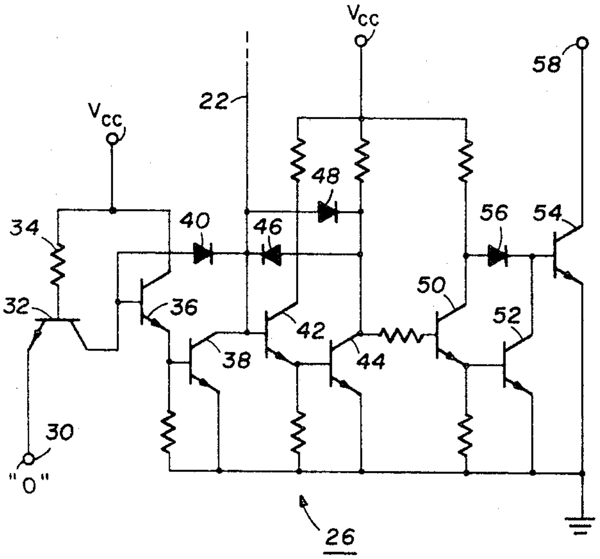
FIGURE 3 is a detailed schematic diagram of a write-read circuit of the circuit illustrated in FIGURE 2.

Each of the write-read amplifiers 26 and 28 may be identical and be comprised of the circuit illustrated in FIGURE 3 and designated by the reference character 26. The portion of the write-read amplifier 26 to the left of the write-read drive line 22 may be considered as the write amplifier, and the portion to the right the read amplifier. The write amplifier has a logic input 30 which is connected to the emitter of a transistor 32. The base of transistor 32 is connected through resistor 34 to the collector voltage supply. The collector of transistor 32 drives the base of emitter-follower transistor 36 which drives the base of transistor 38. The collector of transistor 38 is connected to the drive line 22 and the emitter is connected to ground. The base of transistor 36 is connected to drive line 22 by diode 40. Drive line 22 is also connected to the base of emitter-follower transistor 42 which drives the base of transistor 44. The collector of transistor 44 is connected to line 24 by diodes 46 and 48. The collector of transistor 44 drives the base of transistor 50 which in turn drives the base of transistor 52. Transistor 52 controls the potential at the base of switching transistor 54 the base of which is connected through diode 56 to the collector of transistor 50. The collector of transistor 54 is connected to the output 58 of the read amplifier.

In the operation of the write-read amplifier, transistor 32 is turned "on" and transistors 36 and 38 are turned "off" when a logic "0" level, typically ground potential, is applied to the control terminal 30. As a result, the voltage on line 22 goes to a high value. If a current is flowing through line 22, transistors 42 and 44 will be turned "on", and the current will flow through diode 48 and transistor 44 to ground. The voltage on line 22 will then be the voltage drop across one diode and one saturated transistor. Transistors 50 and 52 will be turned "off", and transistor 54 will be turned "on" so that the output 58 will be at a logic "0" level of essentially ground potential. On the other hand, if no current is flowing through line 24, transistors 42 and 44 will not be turned "on" sufficiently to turn transistors 50 and 52 "off", and transistor 54 will be turned "off" so that the output 58 will be at a high voltage level or logic "1". If control terminal 30 is raised to a logic "1" level, typically an open circuit, transistor 32 is turned "off" and transistors 36 and 38 are turned "on". Then line 22 will be at ground potential plus the drop across transistor 38, which is "on" but not saturated because of diode 40, transistors 42 and 44 will be "off", transistor 54 will be "off", and output 58 will be at a logic "1" level.

In the operation of the system illustrated in FIGURE 2, a particular bit 10 is selected for writing or reading by bringing the coincident address lines $X_n$, $Y_n$ up to a logic "1" level. Current through all of the address emitters X and Y of the address bit is then stopped and the emitters may be considered as essentially reverse biased. Current from the collector voltage supply then must pass through emitter *d* of either transistor 12 or transistor 14.

The system will normally be in the read mode except when writing. Thus, the input control terminals 30 of both write-read amplifiers 26 and 28 will normally be at a logic "0" level. This results in transistor 38 of the respective amplifiers 26 and 28 being turned "off." Then if the current is passing through write-read line 22 in the addressed bit indicating that a logic "0" is stored, output 58 of the logic "0" amplifier will be at a logic "0" level and output 58 of the logic "1" amplifier 28 will be at a logic "1" level. It will be noted that the outputs 58 are negative logic. The logic levels are, of course, reversed if current flows through line 24.

In order to write a logic "0" into the addressed bit, input control 30 of write-read amplifier 26 is raised to a logic "1" level. This turns transistor 38 "on" which lowers the voltage on line 22 to a level equal to the voltage drop across transistor 38 which is "on" but not saturated. The potential on the other write-read line 24 will be equal to the base-emitter drop across both transistors 42 and 44 if no current is flowing through line 22, which exceeds the voltage drop through the transistor 38. As a result, transistor 14 of the addressed bit will be turned "off" and transistor 12 turned "on," and current will pass through write-read line 22. On the other hand, if a logic "1" is to be written in the addressed bit, input 30 of amplifier 28 is raised to a logic "1" level and input 30 of amplifier 26 is retained at a logic "0" level. Write-read line 22 is then made more positive than write-read line 24 so that transistor 12 is switched "off" and transistor 14 is switched "on" so that current passes through line 24.

Referring now to FIGURE 4, another memory system constructed in accordance with the present invention is indicated generally by the reference numeral 100. The entire circuit 100 is typically fabricated on a single integrated circuit chip and includes eight storage bits 101–108, three address decoding gates 110–112, a write-read amplifier 114, and a controllable power supply 116. Each of the storage bits 101–108 is of the same construction as stroge bit 101 which is illustrated in detail schematically in the drawings. Bit 101 is comprised of multiple emitter transistors 120 and 122 the collectors of which are connected by resistors 124 and 126 to the collector supply voltage terminal $V_{cc}$. The collector of transistor 120 is cross-coupled to the base of transistor 122 by a regenerative switching circuit 130, and the collector of transistor 122 is cross-coupled to the base of transistor 120 by a similar switching circuit 132. Transistor 120 has three address emitters *a*, *b*, and *c*, which are connected to corresponding address emitters *a*, *b*, and *c* of transistor 122. Emitter *d* of transistor 120 is connected to a write line 134 and emitter *d* of transistor 122 is connected to a read line 136. As mentioned, the remaining bits 102–108 are of the same configuration and the *d* emitters of the transistors 120 of the several bits are all connected to the write line 134 and the D emitters of all transistors 122 are connected to the read line 136.

Any one of the bits 101–108 may be selectively enabled by inputs A, B and C of address decoding gates 110, 111 and 112, respectively. The decoding gate 110 is typical and is comprised of a first controllable NAND gate including transistors 138, 140 and 142, and a second controllable NAND gate comprised of transistors 144 and 146. The base of transistor 138 and the collector of transistor 140 are connected by resistors 148 and 150 to a controllable power terminal P. Similarly, the base of transistor 144 is connected through resistor 152 to the same controllable power terminal P. An inverted output $\overline{A}$ is connected to the collector of transistor 142 and a noninverted output A is connected to the collector of transistor 146. When a positive voltage supply is applied to power terminal P, transistors 138, 140 and 144 are enabled.

When the input A is at a logic "0" level, transistor 138 is turned "on," transistor 140 is turned "off" and transistor 142 is turned "off" so that output terminal $\overline{A}$ is at a high voltage level or a logic "1" level. Also, transistor 144 is turned "off," which turns transistor 146 "on" so that output A is at a low or logic "0" level. On the other hand, if input A is at a high or logic "1" level, transistor 138 is turned "off," transistor 140 is turned "on" and transistor 142 is turned "on" so that the $\overline{A}$ output goes to a logic "0" level. Transistor 144 is turned "on" and transistor 146 is turned "off," so that output A goes to a logic "1" level.

The outputs $\overline{A}$ and A, $\overline{B}$ and B, $\overline{C}$ and C of the address decoding gates 110–112 are connected to the correspondingly designated inputs to the bits 101–108. Thus, if all of the inputs A, B and C are at a logic "0" level, the address ouputs $\overline{A}$, $\overline{B}$ and $\overline{C}$ will be at a logic "1" level and bit 101 will be addressed. Current through the bit must then pass through emitter *d* of either transistor 120 or 122. It will be noted that all other bits have at least one of the address emitters A, B and C at a low logic level, corresponding to the drop across a saturated transistor, so that current can pass through that particular emitter of both transistors 120 and 122. It will also be noted that at least one of the bits will always be addressed.

The logic number to be written into the addressed bit is applied through data input 160. The write or read mode is selected by input 162. Inputs 160 and 162 are the emitters of a multiple emitter transistor 164 which forms the input logic of a NAND gate having output transistors 166 and 168. The collector of transistor 168, which is the output of the NAND gate, is connected to write line 134. It will be noted that the NAND gate is identical to the NAND gate comprised of transistors 138, 140 and 142 heretofore described, and that the base and collector of transistors 164 and 166 are also enabled from the power supply terminal P. The write-read input 162 is also connected to the input of a second substantially identical inverting gate comprised of transistors 170, 172 and 174, which is also enabled from the power supply P. The output transistor 174 of the inverting gate drives a switching transistor 166 between "cutoff" and saturation. A pair of diodes 178 and 180 connect the collector of the switching transistor 176 to write line 134 to provide a voltage drop of predetermined magnitude when transistor 176 is turned "on." Write line 134 is connected to the collector of a switching transistor 182 through diode 184, and read line 136 is connected to the same collector through diode 186. The base of transistor 182 is driven between cutoff and saturation by transistor 188 the base of which is controlled by power terminal P. Resistor 187 interconnects the power supply terminal P and the collector of transistor 182 to reverse bias diodes 184 and 186 for purposes which will hereafter be described. Thus, when the power terminal P is energized, transistor 188 is turned "on" and transistor 182 is turned "off." When the power is removed from terminal P, transistor 188 turns "off," and transistor 182 saturates as a result of current through resistor 190 from the collector voltage supply.

The read line 136 is connected to the base of transistor 192. The emitter of transistor 192 drives the base of output transistor 194. The collector of transistor 192 is connected to the collector voltage supply through resistor 196. Resistor 198 interconnects the base and emitter of transistor 192 and resistor 200 interconnects the base and emitter of transistor 194. The emitter of transistor 194 is connected to a read output 195.

Power is supplied to the power supply terminal P by transistor 202 the collector of which is connected to the collector supply voltage and the emitter of which is connected to the power terminal P. When a positive voltage is applied to enable control terminal 204, transistor 202 is driven into saturation so that power is supplied to the power terminal P to enable the address decoding circuits 110–112 and the write-read circuit 114.

It will be noted that the system 100 comprises an eight word memory with each word having one bit. When neither reading nor writing, the enable control 204 is maintained at a low potential corresponding to a logic "0" and the power terminal P is at a low voltage level so that substantially no power is consumed by the address decoding gates 110–112 or the write-read amplifier 114. However, power is continually supplied to bits 101–108 to prevent loss of the stored information, to the bases of transistors 176 and 182 to turn these transistors "on," and to the collector of transistor 192 to insure that transistor 194 is turned "off" in the appropriate case. Current through either write line 134 or read line 136 may then pass through diodes 184 and 186 and transistor 182, which is turned "on," so that the potential of the write and read lines 134 and 136 will be the same.

In order to write into a particular bit 101–108, enable control 204 is raised to a logic "1" level to provide power to the terminal P. Logic levels are applied to inputs A, B and C to represent the chosen bit. For example, in order to address bit 101, all three inputs A, B and C would be at a logic "0" level. Then the outputs $\overline{A}$, $\overline{B}$ and $\overline{C}$ would all be at a logic "1" level. The binary number which is to be written into bit 101 is then applied to the input 160 and the write-read input 162 is raised to a logic "1" level representing the write mode. Assume first that a logic "0" is to be written into the addressed bit. The data input 160 would then be at a logic "0", and transistor 164 would conduct, thus turning transistors 166 and 168 "off." Then the write-read input 162 is brought up to a logic "1" level representing the write mode, transistor 170 would be turned "off," thus turning transistors 172 and 174 "on," and transistor 176 "off." It is important that the data input 160 be at the desired level before the write input 162 is brought up. Transistor 182 is turned "off" because power is being supplied to terminal P which turns transistor 188 "on," and the write line 134 will therefore be at a high voltage level corresponding to an open circuit. On the other hand, read line 136 is at a voltage level corresponding to the sum of the base-emitter voltage drop through transistors 192 and 194. Thus, the emitter *d* of transistor 120 will be at a higher potential than emitter *d* of transistor 122. As a result, transistor 120 will be turned "off" and transistor 122 turned "on." Current through the addressed bit then passes through the read line 136 turning transistors 192 and 194 "on" so that the data output 195 goes to a logic "0" level, indicating that a logic "0" is stored in the addressed bit.

On the other hand, when a logic "1" is to be written in the addressed bit, a logic "1" is applied to the data input 160. Then when the write-read select input 162 is raised to a logic "1" level, transistor 164 is turned "off," thus turning transistors 166 and 168 "on." Transistor 170 is again turned "off" so that transistors 172 and 174 are turned "on" and transistor 176 turned "off." Thus, the write line 134 is reduced to a low potential equal to the voltage drop through saturated transistor 168. This voltage is substantially less than the voltage drop through the base-emitters of transistors 192 and 194, so that emitter *d* of transistor 122 is at a higher potential than emitter *d* of transistor 120. Thus, transistor 120 will be turned "on" and transistor 122 turned "off" so that current will flow through write line 134, rather than through read line 136. When the write-read input 162 is again returned to a logic "0," transistor 176 will turn "on" and transistor 168 will turn "off" so that the current will pass through diodes 178 and 180 and through the saturated transistor 176. Since no current is then flowing through the read line 136, transistor 192 and transistor 194 will be turned "off" and output 195 will be at a high logic "1" level, indicating that a logic "1" is stored in the bit.

As previously mentioned, the memory system 100 illustrated in FIGURE 4 comprises an eight word memory system, each word having one bit, which is typically fabricated upon a single semiconductor chip. The system can be expanded to substantially any number of words with substantially any number of bits by connecting the memory systems 100 as illustrated in FIGURE 5. Thus, two of the systems **100*a* and 100*b* would be connected so as to form words $W_1$–$W_8$ each having bits $B_1$ and $B_2$, and systems 100*c* and 100*d* interconnected to form words $W_9$–$W_{16}$, also having bits $B_1$ and $B_2$. Of course, additional systems 100 can be used to provide additional bits for words $W_1$–$W_8$ and $W_9$–$W_{16}$. Address inputs A, B and C are common to both systems 100*a* and 100*b* so that the corresponding bits of a particular word will be simultaneously addressed. Similarly, address lines A, B, and C to systems 100*c* and 100*d* are common so that all bits bits of each of the words $W_9$–$W_{16}$ will be addressed simultaneously. Since sixteen words are provided, a four digit binary input is required to identify each of the sixten words as represented by the four inputs 222 to a decoder circuit 224. Thus, it will be noted that all bits of each word are simultaneously addressed. The circuits 100*a* and 100*b* are energized by a separate enable control 204*a*, while the circuits 100*c* and 100*d* are energized by a separate enable control 204*c*. On the other hand, the data input 160*a* is common for the corresponding bits, i.e., bits $B_1$, of the sixteen words, and therefore is connected to both systems 100*a* and 100*c*, and data input 160*b* is connected to both systems 100*b* and 100*d*. Similarly, the data output 195*a* is common to both systems, 100*d* and 100*c*, while data output 195*b* is common to systems 100*b* and 100*d*. A single write-read mode input 162 may be provided for all four systems 100*a*–100*d***.

In the opertion of the system illustrated in FIGURE 5, a particular word of the sixteen is addressed and enabled by the binary code applied to the four address inputs 222. Only one of the enable inputs **204*a* or 204*c* will be raised to a logic "1" level. Then depending upon whether the write or read mode is selected by input 162, each bit of the enabled word is operated upon independently by inputs 160*a* and 160*b* for writing, or by outputs 195*a* and 195*b*** for reading.

From the above detailed description of preferred embodiments of the invention, it will be noted that a very simple binary storage means has been described. Each binary storage means has but two active elements and these elements perform one level of address decoding in addition to performing the storage function. A memory system has been described which can be fabricated as a complete integrated circuit, and the individual systems easily combined to produce systems of greater storage capacity. The systems have random access and nondestructive readout, and high operating speeds.

Although preferred embodiments of the invention have been described in detail, it is to be understood that various changes, substitutions and alterations can be made therein without departing from the spirit and scope of the invention as defined by the appended claims.

What is claimed is:

1. In a momory system, the combination of:

a plurality of binary storage means each comprised of first and second transistor means the collectors of which are connectable to a voltage supply and the bases and collectors of which are cross-coupled to provide regenerative switching, each transistor means having at least one address emitter and a write-read emitter, address circuit means for selectively stopping the flow of current through all of the address emitters of a selected binary storage means to enable the binary storage means, and write-read circuit means interconnecting all of the write-read emitters of the first transistor means and interconnecting all of the write-read emitters of the second transistor means for selectively establishing a voltage differential between the write-read emitters of the first transistor means and the write-read emitters of the second transistor means of the enabled binary storage means to switch one of the transistor means of the binary storage means "on" and the other "off", and for detecting the presence or absence of current through one of the write-read emitters of the enabled binary storage means.

2. The combination defined in claim 1 wherein all components of the combination are fabricated on a common substrate.

3. The combination defined in claim 1 wherein:

there are $2^n$ binary storage means, each transistor means has *n* address emitters, and the address circuit means has *n* binary inputs and includes decoding means connected to reverse bias all of the address emitters of one binary storage means for each combination of binary inputs.

4. The combination defined in claim 3 wherein all components of the combination are fabricated on a common substrate.

5. The combination defined in claim 1 wherein the write-read circuit means comprises:

a first write-read line connected to the write-read emitters of the first transistor means of all binary storage means, a second write-read line connected to the write-read emitters of the second transistor means of all binary storage means, read circuit means connected to the first write-read line for establishing a first voltage level at the write-read line and for sensing the presence or absence of current in the line, write enable circuit means connected to the second write-read line for selectively and alternatively establishing said first voltage level or a second voltage level higher than the first in response to a write-read input signal, and write circuit means connected to the second write-read line for selectively and alternatively establishing said second voltage level and a third voltage level lower than said first voltage level in response to a data input signal.

6. The combination defined in claim 5 wherein the write enable circuit means and the write circuit means may be selectively turned "off" to reduce power consumption and further characterized by means connected to the first and second write-read lines for establishing equal voltage levels on the write-read lines when the write circuit means and the write enable circuit means are turned "off," the equal voltage levels being lower than the voltage level resulting at the address emitters when the current through the address emitters is turned "off" to preserve the state of the binary storage means.

7. The combination defined in claim 5 wherein the write-read circuit means comprises:

a first write-read line connected to the write-read emitters of the first transistor means of all the binary storage means, a second write-read line connected to the write-read emitters of the second transistor means of all the binary storage means, and first and second write-read circuit means connected to the first and second write-read lines, respectively, each write-read circuit means comprising means for establishing first and second voltage levels and means for sensing the presence or absence of current through the respective write-read line.

8. In a memory system, the combination of:

a plurality of binary storage bits arranged in a plurality of words, each word having a corresponding number of binary storage bits, each binary storage bit being comprised of first and second transistor means the collectors of which are connectable to a voltage supply and the bases and collectors of which are cross-coupled to provide regenerative switching, each transistor means having at least one address emitter and a write-read emitter, address circuit means for selectively stopping the flow of current through all of the address emitters of the binary storage bits of a selected word, and a wrie-read circuit means for each set of corresponding bits of the words, each write-read circuit means including first and second write-read lines connected to the write-read emitters of the first and second transistor means, respectively, of the corresponding storage bits of all words, means for selectively establishing a voltage differential of a selected polarity between the first and second write-read lines, and means for detecting the presence or absence of current through at least one of the write-read lines.

9. In a memory system, a binary storage means comprising a pair of multiple emitter transistor means the collectors of which are connectable to voltage supply means, first regenerative switching means connecting the collector of one transistor means to the base of the other transistor means, and second regenerative switching means connecting the collector of said other transistor means to the base of said one transistor means, whereby the binary storage means may be selectively addressed by stopping the flow of current through all emitters except one on each transistor means and a binary number may then be stored in the binary storage means by applying different voltage levels to the other two emitters, and the binary number stored may be sensed by detecting the presence or absence of current through one of said other two emitters.

10. In a memory system, a binary storage means comprising first and second transistor means the collectors of which are connectable to voltage supply means, first regenerative switching means connecting the collector of the first transistor means to the collector of the second transistor means, second regenerative switching means connecting the base of the second transistor means to the collector of the first transistor means, each transistor means having an equal number of address emitters, each address emitter of the first transistor means being connected to a corresponding address emitter of the second transistor means, each transistor means having a write-read emitter, whereby the binary storage means may be selectively addressed by stopping the flow of current through each pair of interconnected address emitters of the binary storage means and a binary number may then be written into the binary storage means by establishing a voltage differential of a selected polarity between the two write-read emitters to cause one of the transistor means to switch "on" and the other to switch "off" and the stored binary number may be read out by detecting the presence or absence of current through one of the write-read emitters.

References Cited

UNITED STATES PATENTS 3,177,374 4/1965 Simoniaos -------- 307—200 X

TERRELL W. FEARS, *Primary Examiner.*

U.S. Cl. X.R.

307—238